(12) United States Patent
Hayashi et al.

(10) Patent No.: US 7,984,991 B2
(45) Date of Patent: Jul. 26, 2011

(54) PROJECTOR INCLUDING AUDIO DATA SWITCHING UNIT FOR SWITCHING AUDIO DATA OUTPUT TO SPEAKERS AND CONTROL METHOD FOR THE SAME

(75) Inventors: Naoki Hayashi, Matsumoto (JP); Satoru Nasukawa, Matsumoto (JP); Hirokazu Kamatori, Matsumoto (JP); Takanao Umeki, Sanbu-gun (JP); Tetsushi Kimura, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 425 days.

(21) Appl. No.: 12/170,311

(22) Filed: Jul. 9, 2008

(65) Prior Publication Data

US 2009/0015792 A1   Jan. 15, 2009

(30) Foreign Application Priority Data

Jul. 13, 2007  (JP) ................................. 2007-184688
May 21, 2008  (JP) ................................. 2008-132816

(51) Int. Cl.
    *G03B 31/00* (2006.01)
(52) U.S. Cl. .......................................... 353/15; 359/444
(58) Field of Classification Search .................... 353/52, 353/57, 58, 60, 61, 119
    See application file for complete search history.

(56) References Cited

U.S. PATENT DOCUMENTS

| 7,035,086 B2 * | 4/2006 | Williams et al. ......... 361/679.02 |
| 7,144,122 B2 | 12/2006 | Sakarai |
| 7,216,989 B2 | 5/2007 | Sakarai |

FOREIGN PATENT DOCUMENTS

| JP | 2002-290877 | 10/2002 |
| JP | 2005-77912 | 3/2005 |
| JP | 2005-99617 | 4/2005 |
| JP | 2006-72037 | 3/2006 |
| JP | 2006-174074 | 6/2006 |
| JP | 2006-217307 | 8/2006 |

\* cited by examiner

*Primary Examiner* — Tony Ko
(74) *Attorney, Agent, or Firm* — AdvantEdge Law Group, LLC (57) ABSTRACT

A projector, includes: a projector body that includes an optical modulator that modulates light emitted from a light source according to an inputted image data to form an optical image and a projection optical device that projects the formed optical image in an enlarged manner; an audio system that includes a speaker that outputs sounds according to inputted audio data; and an audio data switching unit that switches the audio data outputted to the speaker according to a setting position of the projector.

5 Claims, 9 Drawing Sheets

PROJECTOR INCLUDING AUDIO DATA SWITCHING UNIT FOR SWITCHING AUDIO DATA OUTPUT TO SPEAKERS AND CONTROL METHOD FOR THE SAME

The entire disclosure of Japanese Patent Applications No. 2007-184688 filed Jul. 13, 2007, and No. 2008-132816 filed May 21, 2008, is expressly incorporated by reference herein.

BACKGROUND

1. Technical Field

A projector and a control method for the same.

2. Related Art

The invention relates to a projector and a control method for the projector.

A projector including: a projector body which includes an optical modulator that modulates light emitted from a light source according to inputted image data to form an optical image and a projection optical device that projects the formed optical image in an enlarged manner; and an image output device which outputs image data to the projector body, in which the projector body and the image output device are relatively rotatable, has been known (see, for example, Document 1: JP-A-2005-99617).

The projector disclosed in Document 1 includes a projection portion (the projector body) connected to a DVD (Digital Versatile Disk) player (the image output device) via the connecting portion provided on top of the DVD player. The projection portion is rotatable relative to the DVD player. Accordingly, a user of the projector can set the projector so that a side of the DVD player on which manipulating portions such as a DVD slot faces the user him/herself and use the projector in a manner that the optical image formed by the projector body is projected toward projection surfaces such as a screen.

A projector that includes a pair of speakers that output sounds based on audio data as well as the above projector body and image output device is also known (see, for example, Document 2: JP-A-2006-72037).

The projector disclosed in Document 2 is provided with the pair of speakers to both sides of the DVD slot formed on a rear side of the projector.

A stereo speaker system constituted by the pair of speakers outputs different sounds from each of the pair of speakers based on left audio data for outputting sounds from a speaker positioned at a left side of the user and right audio data for outputting sounds from a speaker positioned at a right side of the user. As a result, a strong sense of presence can be obtained when the user of stereo speaker system listens to the sounds.

Here, a projector in which the projection portion is formed rotatable relative to the DVD player as in the projector disclosed in Document 1 is taken as an example to discuss a problem (it is supposed that the pair of speakers is provided to the side of the DVD player on which the manipulation portions are provided). When the projector is disposed in front of the user and the side on which the pair of speakers is provided faces the user, the arrangement of the speakers is reversed compared to the arrangement the speakers take when the projector is disposed in front of the user and the side on which the pair of speakers is provided faces the user. In short, the speakers exchange the positions thereof according to the setting position of the projector.

Accordingly, cases occur in which the sounds based on the right audio data are outputted from the speaker on the left of the user and the sounds based on the left audio data are outputted from the speaker on the right of the user. In such cases, the user of the projector cannot enjoy sounds with a strong sense of presence.

SUMMARY

An advantage of some aspects of the present invention is in providing a projector with which a user can enjoy sounds with a sense of presence and a control method of the projector.

A projector according to an aspect of the invention includes: a projector body that includes an optical modulator that modulates light emitted from a light source according to an inputted image data to form an optical image and a projection optical device that projects the formed optical image in an enlarged manner; an audio system that includes a speaker that outputs sounds according to inputted audio data; and an audio data switching unit that switches the audio data outputted to the speaker according to a setting position of the projector.

According to the aspect of the invention, the projector includes the audio data switching unit which switches the audio data outputted to the speakers according to the setting position of the projector. Accordingly, even when the setting position of the projector is changed, the user can enjoy sounds with a sense of presence. Incidentally, the audio data switching unit may, for example, obtain data on the setting position of the projector via an operation input by the user and switch the audio data based on the obtained data.

In the above arrangement, a connecting mechanism that connects the projector body and the audio system in a relatively rotatable manner and a rotational position detector that detects a rotational position of the projector body and the audio system are preferably provided, the speaker provided to the audio system preferably includes at least a pair of speakers, and the audio data switching unit preferably switches the audio data respectively outputted to each of the speakers based on detection by the rotational position detector.

According to the above arrangement, the projector is provided with the rotational position detector. Accordingly, for example, when the projector body and the audio system are relatively rotated, the rotational position detector detects the rotational positions where the arrangement of the speakers is reversed. According to the above arrangement, in addition, the audio data switching unit switches based on the detection by the rotational position detector audio data outputted to the speakers. Accordingly, even when the projector body and the audio system are rotated, the user can enjoy sounds with a sense of presence. Furthermore, a plurality of rotational position detectors may be provided to detect the rotational position with greater accuracy.

In the above arrangement, the pair of speakers arranged to output sounds substantially in the same direction is preferably provided, and the rotational position detector detects as the rotational position of the projector body and the audio system a first projection position at which the projection optical device and the pair of speakers are on the same side and a second projection position at which the projection optical device and the pair of speakers are on opposite sides.

When the projection optical device and the speakers are on the same side at the first projection position, the user is assumed to have set the projector behind the user. When the projection optical device and the speakers are on opposite sides at the second projection position, the user is assumed to have set the projector in front of the user. In addition, the user is assumed to be facing the screen on which the optical image is projected in an enlarged manner. Thus, the first and second projection positions are such positions that relative positions of the speakers relative to the projector body are exchanged when the projector body and the audio system are relatively rotated from one of the first and second projection positions to the other.

According to the above arrangement, the rotational position detector detects the first projection position and the second projection position, which helps the audio data switching unit to switch the audio data so that sounds based on the left audio data are outputted from the speaker on the user's left side and sounds based on the right audio data are outputted from the speaker on the user's right side. Therefore, even when setting position of the projector is changed, the user can enjoy sounds with a sense of presence.

In the above arrangement, the audio data switching unit preferably instructs the audio system to continuously output the audio data.

In the above arrangement, the audio system can continuously output sounds even when the rotational position of the projector body and the audio system is at an intermediate position between the first projection position and the second projection position.

In the above arrangement, the speaker provided to the audio system preferably includes at least three speakers.

With this arrangement, the same effects and advantages as the above projector can be obtained. In addition, since the projector includes at least three speakers, the user can enjoy sounds with even greater sense of presence compared to a projector having less than three speakers.

A control method according to another aspect of the present invention is a control method of a projector including: a projector body that includes an optical modulator that modulates light emitted from a light source according to an inputted image data to form an optical image and a projection optical device that projects the formed optical image in an enlarged manner; an audio system that includes a speaker including at least a pair of speakers that output sounds according to inputted audio data; and a connecting mechanism that connects the projector body to the audio system in a relatively rotatable manner, the control method including: an audio output switching step that switches audio data to be outputted to the speakers based on detection by a rotational position detector that detects a rotational position of the projector body and the audio system.

With this arrangement, the same effects and advantages as the above projector can be obtained.

BRIEF DESCRIPTION OF THE DRAWINGS

The invention will be described with reference to the accompanying drawings, wherein like numbers reference like elements.

DESCRIPTION OF EXEMPLARY EMBODIMENT(S)

First Exemplary Embodiment

Figure 1:
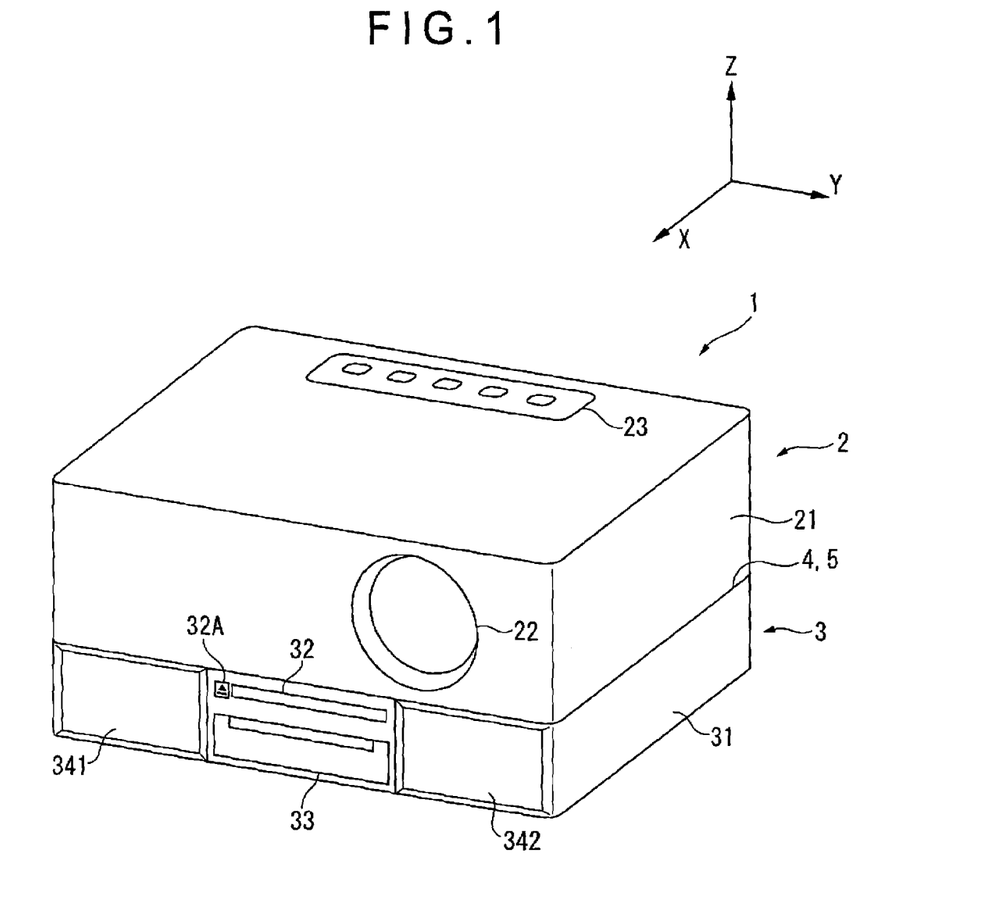
FIG. 1 is a front perspective view showing a projector according to a first exemplary embodiment.
Figure 2:
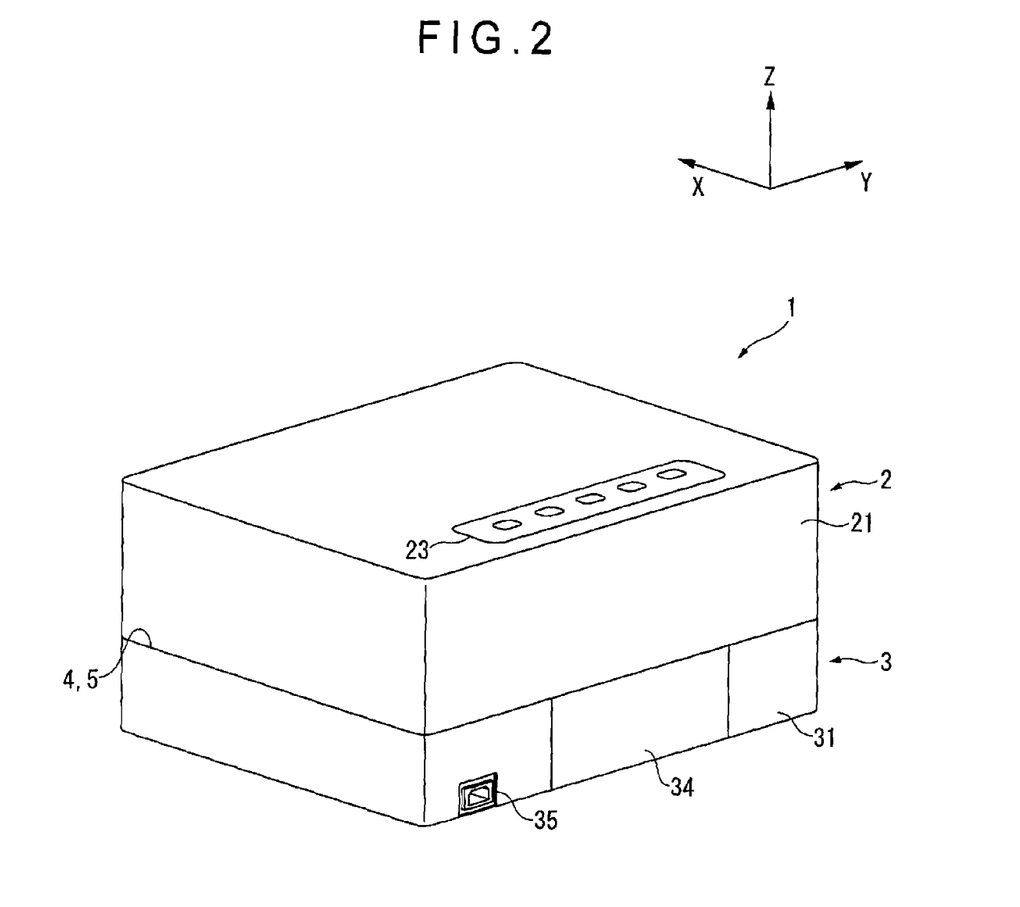
FIG. 2 is a rear perspective view showing the projector according to the exemplary embodiment.
Figure 3:
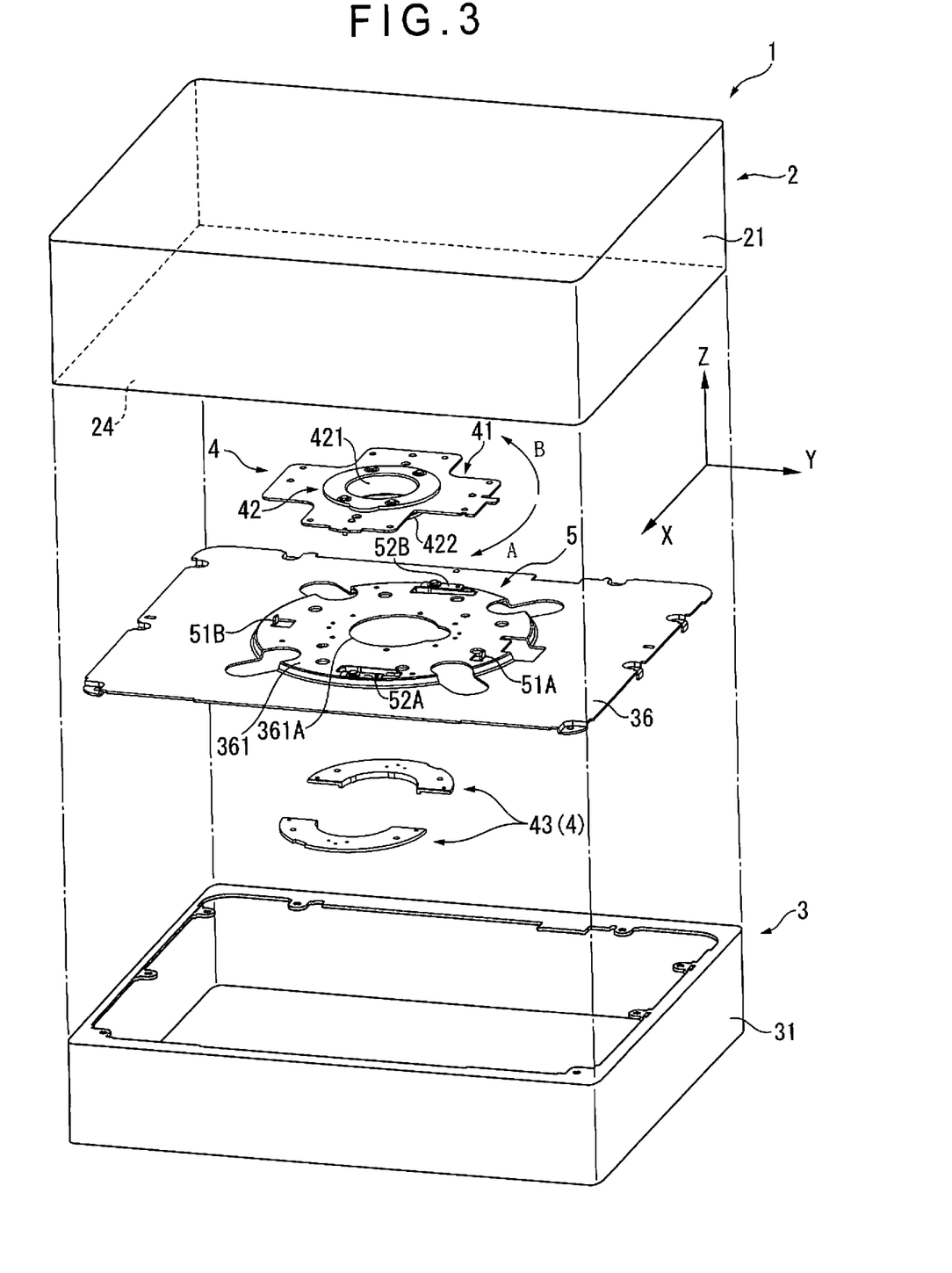
FIG. 3 is an exploded front perspective view showing the projector according to the exemplary embodiment.

A first exemplary embodiment of the invention will be described below with reference to the drawings.
Overall Arrangement of Projector FIG. 1 is a front perspective view of a projector 1 viewed. FIG. 2 is a rear perspective view of the projector 1. FIG. 3 is an exploded front perspective view showing the projector 1. In FIGS. 1 to 3, for convenience of description, a direction from the rear to the front of the projector 1 is defined as X-axis, and two axes perpendicular to X-axis are respectively defined as Y-axis (the horizontal axis) and Z-axis (the vertical axis). The same applies to the remaining drawings.

As shown in FIGS. 1 to 3, the projector 1 includes: a projector body 2 which modulates light emitted from a light source according to inputted image data to form an optical image and projects the formed optical image in an enlarged manner; a DVD player 3 which outputs the image data to the projector body 2, a connecting mechanism 4 which rotatably connects the projector body 2 and the DVD player 3; a rotation restricting mechanism 5 which restricts the rotation of the projector body 2 and the DVD player 3, and a rotational position detector 6 (see, FIG. 4) which detects rotational positions of the projector body 2 and the DVD player 3. Note that the internal arrangements of the rotational position detector 6 and the projector 1 will be described in detail below.

As shown in FIGS. 1 and 2, the projector body 2 is mounted on an upper side (+Z-axis direction side) of the DVD player 3 and includes an upper case 21 substantially shaped in a rectangular parallelepiped, a projection lens 22 exposed at a front surface (surface on +X-axis direction side) of the upper case 21, and an operation panel 23 provided on an upper surface (surface on +Z-axis direction side) near a rear portion (−X-axis direction side) of the upper case 21. The operation panel 23 is for conducting operations such as a startup and an adjustment of the projector 1 and operations such as a reproduction and a stop of the DVD player 3. When the operation panel 23 is operated, the DVD player 3 conducts a reproduction, a stop of the reproduction and the like of image data, audio data and the like recorded on a recording medium such as a DVD inserted in the DVD player 3.

The DVD player 3 reproduces the recording medium such as a DVD or the like to output the image data recorded on the recording medium to the projector body 2 via an image cable (not shown). As shown in FIGS. 1 and 2, the DVD player 3 is disposed at a lower side (−Z-axis direction side) of the projector body 2 and includes a lower case 31 substantially shaped in a rectangular parallelepiped, a DVD slot 32 provided to a substantially central portion of a front surface of the lower case 31, a DVD operation display 33 provided to a lower side of the DVD slot 32, speakers 341 and 342 provided to both sides of the DVD operation display 33, and an interface cover 34 and an inlet connector 35 provided to a rear surface (surface on −X-axis direction side) of the lower case 31.

The DVD slot 32 is of slot-in-type, where a recording medium such as a DVD is inserted and ejected. The DVD player 3 reproduces image data, audio data and the like recorded on the recording medium inserted to the DVD slot 32. An eject switch 32A for ejecting the recording medium is attached side by side with the DVD slot 32.

The DVD operation display 33 displays states of the DVD player 3 such as a reproduction state or a stop state. The user can see the DVD operation display 33 to check the states of the DVD player 3 such as the reproduction state in which a recording medium is being reproduced and the stop state in which such reproduction is stopped.

The speakers 341 and 342 are arranged as a pair of stereo speakers, where sounds are outputted according to inputted audio data. For example, sounds based on audio data recorded on the recording medium inserted to the DVD slot 32 are outputted therefrom. In short, the DVD player 3 constitutes an audio system of the exemplary embodiment. Incidentally, the speakers 341 and 342 are arranged to output sounds substantially in the same direction.

In the interface cover 34, a variety of interface connectors (not shown) such as an image input terminal for inputting image data to the projector 1 from an exterior thereof are provided. These interface connectors are protected by the interface cover 34. The interface cover 34 is opened when the variety of interface connectors are used. Incidentally, the interface cover 34 may be omitted.

The inlet connector 35 for connecting an AC power cable from the outside is not covered by the interface cover 34 but is exposed.

As shown in FIG. 3, the connecting mechanism 4 includes a plate member 41 fixed to a bottom plate 24 of the projector body 2, a rotational member 42 fixed to the plate member 41 and rotatably attached to a top plate 36 of the DVD player 3, and a plurality of separated ring members 43 via which the rotational member 42 is attached to the top plate 36.

Note that not all the members are shown in FIG. 3. For instance, the projection lens 22 exposed on the upper case 21 (see, FIG. 1) and the DVD slot 32 provided to the lower case 31 (see, FIG. 1) are not shown.

The plate member 41 is a plate-shaped member formed substantially cross-shaped in plan view and includes four end portions extending in four directions, neighboring two of which are substantially perpendicular with each other. The rotational member 42 is fixed to a substantially central portion of the plate member 41 by a plurality of screws.

The rotational member 42 includes a rotational member body 421 substantially cylindrically shaped and an extending portion 422 extending outwardly from an end of the rotational member body 421 adjacent to the top plate 36 in a direction perpendicular to an axial direction.

A substantially disc-shaped base 361 protruding upward is formed at a substantially central portion of the top plate 36 by press molding or the like. A substantially ring-shaped opening 361A is formed substantially at the center of the base 361. The rotational member 42 is inserted to the opening 361A from an upper side in a state fixed to the plate member 41.

The separated ring members 43 are divisions of a flat ring plate having substantially the same inner diameter as an outer diameter of the rotational member body 421 and has substantially the same thickness as a gap formed between the top plate 36 and the extending portion 422 when the rotational member 42 is inserted to the opening 361A.

The separated ring members 43 are inserted to the gap between the top plate 36 and the extending portion 422 in a manner sandwiching the rotational member body 421, where the separated ring members 43 are fixed to the top plate 36 by a plurality of screws. The top plate 36 is fixed to the lower case 31 by a plurality of screws.

Stoppers 51A and 51B folded to protrude upward are provided to two portions on a periphery of the base 361, one stopper to a portion of the periphery adjacent to a right end thereof (+Y-axis direction side) and the other stopper to a portion of the periphery adjacent to a left end thereof (−Y-axis direction side). Click springs 52A and 52B are attached to two portions on the periphery of the base 361, one click spring to a portion of the periphery adjacent to a front end thereof (+X-axis direction side) and the other to a portion of the periphery adjacent to a rear end thereof (−X-axis direction side).

The stoppers 51A and 51B abut to the plate member 41 to restrict a rotation of the plate member 41 in a predetermined direction. Specifically, when the projection lens 22 of the projector body 2 and the DVD slot 32, the DVD operation display 33, and the speakers 341 and 342 are on the same side as shown in FIGS. 1 to 3, the stopper 51A abuts to the plate member 41 to restrict the rotation of the plate member 41 in the clockwise direction in top view (shown by arrow A in FIG. 3). When the projection lens 22 and the DVD slot 32, the DVD operation display 33, and the speakers 341 and 342 are on the opposite sides, the stopper 51B abuts to the plate member 41 to restrict the rotation of the plate member 41 in the counterclockwise direction (shown by arrow B in FIG. 3).

When the plate member 41 abuts to the stoppers 51A and 51B, the click springs 52A and 52B give the plate member 41 a force to resist a rotation opposite to the rotation in the predetermined direction restricted by the stoppers 51A and 51B.

Accordingly, if the plate member 41 is to be rotated in a direction to be disengaged from the stoppers 51A and 51B, a greater force than the force given by the click springs 52A and 52B has to be applied thereon. Thus, the click springs 52A and 52B cause the plate member 41 to stay stationary abutted to the stoppers 51A and 51B. Note that in the exemplary embodiment the stationary position at which the plate member 41 is abutted to the stopper 51A will be referred to as a first projection portion (see, FIGS. 1 to 3), and the stationary position at which the plate member 41 is abutted to the stopper 51B will be referred to as a second projection position.

Arrangement of Rotational Position Detector

Figure 4:
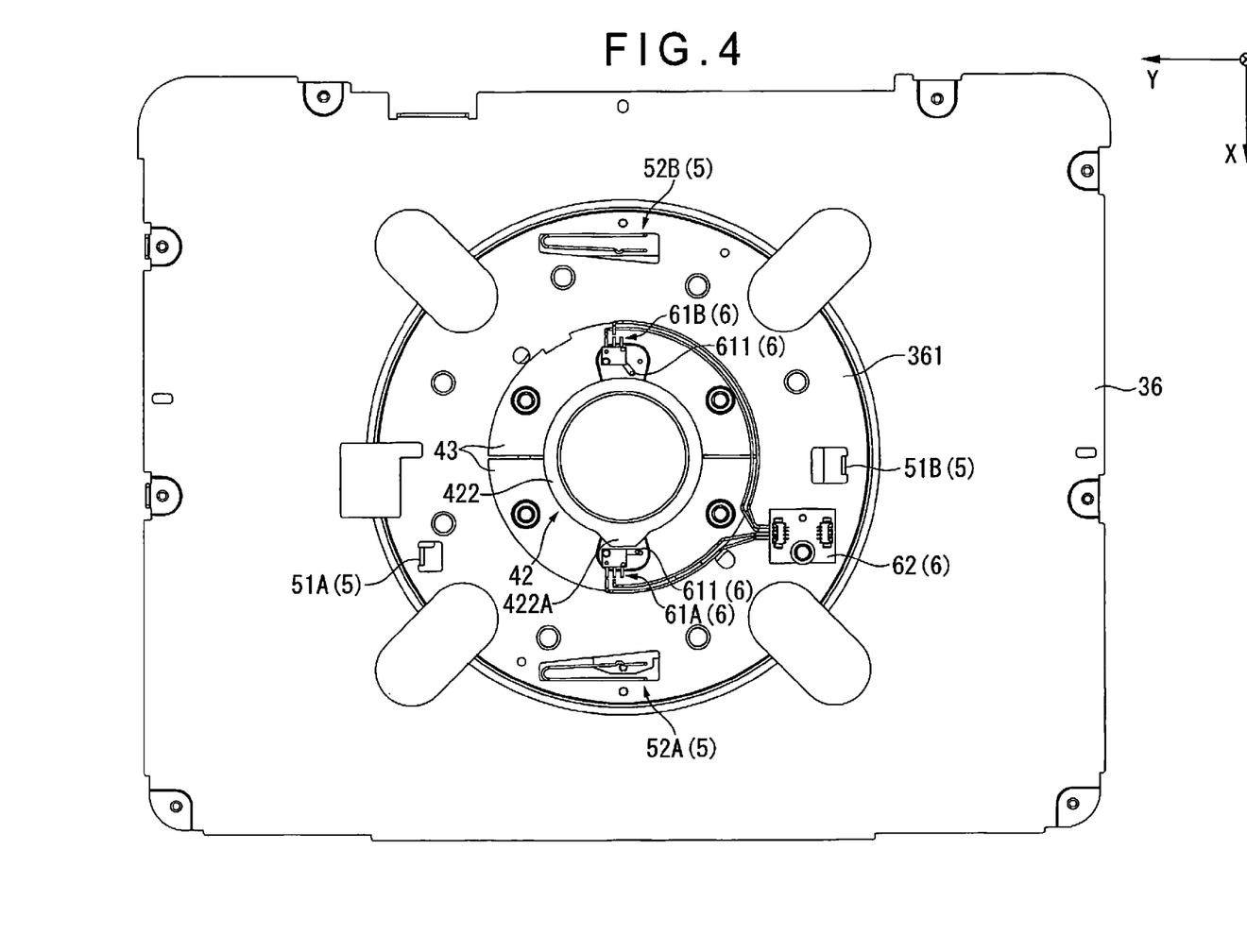
FIG. 4 shows a top plate seen from bottom when the projector according to the exemplary embodiment is in a stationary state at a first projection position.

FIG. 4 shows the top plate 36 seen from bottom when the projector 1 is in a stationary state at the first projection position.

As shown in FIG. 4, the rotational position detector 6 includes switches 61A and 61B and a switch board 62. The switches 61A and 61B are substantially rectangular-shaped in plan view and attached to a substantially central position of each of the separated ring members 43. The switch board 62 is attached to the base 361 to detect whether the switches 61A and 61B are conducted or not.

The switches 61A and 61B are provided along the direction of the relative rotation of the rotational member 42 and the top plate 36, that is, the direction of the relative rotation of the projector body 2 and the DVD player 3, to detect the rotational positions of the projector body 2 and the DVD player 3. Shafts 611 are provided to corners of the switches 61A and 61B in a fashion projecting outward substantially along extensions of diagonal lines across the switches 61A and 61B. The shafts 611 are rotatable about the corners of the switches 61A and 61B and biased about the corners of the switches 61A and 61B toward the rotational member 42. Incidentally, the switches 61A and 61B are not conducted when force is not applied on the shafts 611 (i.e., in the state of the switch 61B shown in FIG. 4). When force is applied on the shafts 611 to push the shafts 611 into an attitude substantially parallel to lateral sides of the switches 61A and 61B adjacent to the rotational member 42 (i.e., in the state of the switch 61A shown in FIG. 4), the switches 61A and 61B are conducted.

The extending portion 422 of the rotational member 42 is provided with a protrusion 422A, which protrudes toward the click spring 52A when the projector 1 is stationary at the first projection position. The protrusion 422A is so positioned that the protrusion 422A applies force on the shaft 611 of the switch 61A when the projector 1 is stationary at the first projection position and the protrusion 422A applies force on the shaft 611 of the switch 61B when the projector 1 is stationary at the second projection position.

In other words, when the projector 1 is stationary at the first projection position, the switch 61A is conducted and the switch 61B is not conducted. On the other hand, when the projector 1 is stationary at the second projection position, the switch 61A is not conducted and the switch 61B is conducted. When the projector 1 is rotating, that is, when the projector 1 is neither at the first projection position nor the second projection position, neither of the switches 61A and 61B is conducted.

The switch board 62 is a circuit board for detecting conductance (ON state) or non-conductance (OFF state) of the switches 61A and 61B and outputs the detected ON or OFF state to the controller 26.

Internal Arrangement of Projector

Figure 5:
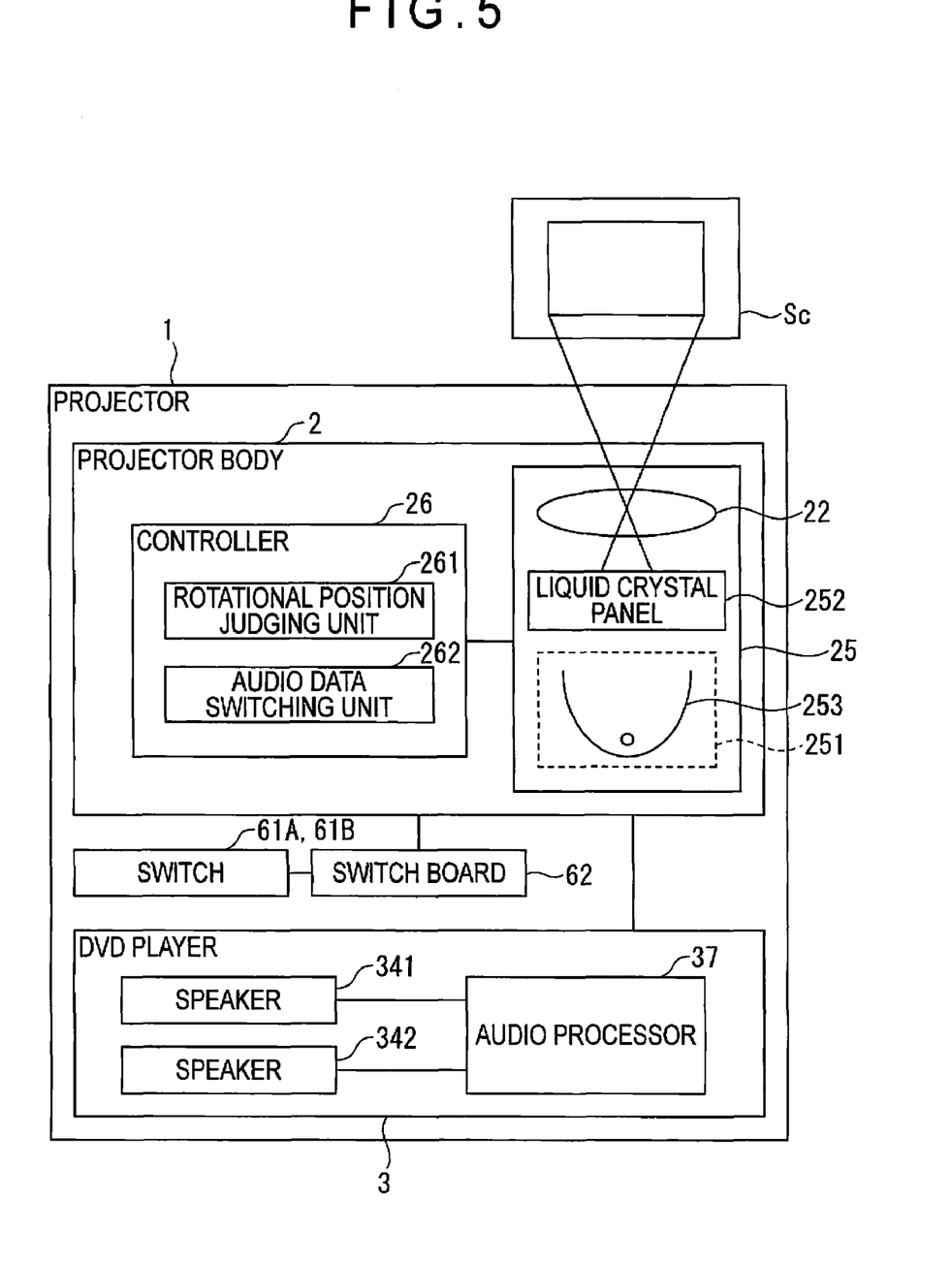
FIG. 5 is a block diagram showing an internal arrangement of the projector according to the exemplary embodiment.

FIG. 5 is a block diagram showing an internal arrangement of the projector 1.

As shown in FIG. 5, the DVD player 3 includes an audio processor 37.

The audio processor 37 includes, for example, a DSP (digital signal processor) and processes audio data recorded on a recording medium. More specifically, the audio processor 37 separately processes left audio data for outputting sounds from a speaker located to the left of a user and right audio data for outputting sounds from a speaker located to the right of the user, based on the audio data recorded on the recording medium. Subsequently, the processed left audio data and right audio data are outputted via separate signal lines to the speakers 341 and 342 respectively communicated with the audio processor 37. Here, the controller 26 described below controls selecting from the speakers 341 and 342 the speaker to which the left audio data and the right audio data are respectively outputted.

In FIG. 5, the projector body 2 is schematically illustrated including an image projection unit 25 and the controller 26.

The image projection unit 25 modulates light emitted from a light source according to image data to form an optical image and projects the formed optical image in an enlarged manner on a projection surface such as the screen Sc. The image projection unit 25 includes a light source device 251, a liquid crystal panel 252, and the above-mentioned projection lens 22.

The light source device 251 includes a light source lamp 253 formed of a high-pressure discharge lamp. The light source lamp 253 emits light toward the liquid crystal panel 252. Incidentally, the light source device 251 may include not the light source lamp 253 but any one of a variety of self light-emitting elements such as a light-emitting diode, a laser diode, and an organic EL element.

The optical modulator in the form of the liquid crystal panel 252 is a transmissive liquid crystal panel, which varies an alignment of the liquid crystal molecules sealed in a liquid crystal cell (not shown) based on the image data, transmits or blocks the light emitted from the light source lamp 253 to modulate the light according to the image data to form an optical image, and emits the formed optical image to the projection lens 22.

The projection optical device in the form of the projection lens 22 is arranged as a set of lenses formed of a plurality of lenses accommodated in a cylindrical lens barrel (not shown). The projection lens 22 projects in an enlarged manner toward the screen Sc the optical image emitted from the liquid crystal panel 252. The projected image based on the emitted optical image is displayed on the screen Sc.

Incidentally, the projector body 2 includes a color separating device (not shown) in which the light emitted from the light source lamp 253 is separated into three colors of RGB (red, green, and yellow). The above-mentioned liquid crystal panel 252 corresponds to the three colors of RGB separated by the color separating optical device. The projector body 2 includes a color-combining optical device that generates an optical image that represents a color image by combining optical images in the three colors.

The controller 26 includes, for example, a CPU (central processing unit) and controls the entire projector body 2. The controller 26 includes a rotational position judging unit 261 and an audio data switching unit 262.

The rotational position judging unit 261 judges which of the first projection position, the second projection position, or an intermediate position (i.e. a rotational position between a first projection position and a second projection position) the projector body 2 and the DVD player 3 are located at based on the ON and OFF states of the switches 61A and 61B outputted from the switch board 62.

Based on the judgment by the rotational position judging unit 261, the audio data switching unit 262 instructs the audio processor 37 to switch the audio data to be outputted to the speakers 341 and 342.

Control Process of Projector

Figure 6:
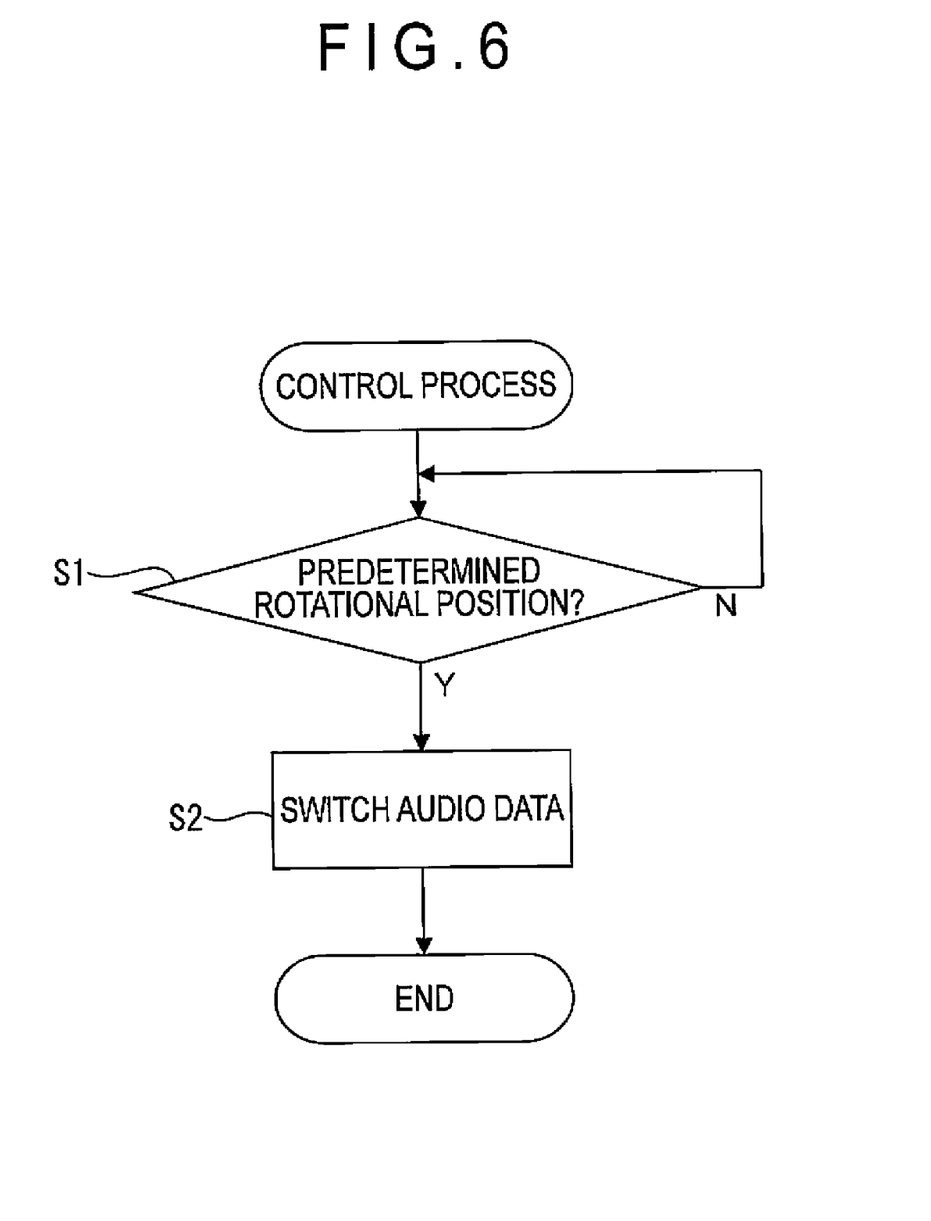
FIG. 6 is a flowchart showing a control process for the projector according to the exemplary embodiment.

FIG. 6 is a flowchart showing a control process for the projector 1.

When a power button is pushed, the projector 1 carries out the following process in addition to enlarging and projecting toward the screen Sc the optical image formed according to the image data.

The rotational position judging unit 261 judges the rotational position of the projector body 2 and the DVD player 3 via monitoring the ON and OFF states of the switches 61A and 61B outputted from the switch board 62 (step S1: rotational position judging step). Specifically, if the switch 61A is in the ON state and the switch 61B is in the OFF state, the rotational position judging unit 261 judges the projector 1 to be stationary at the first projection position. On the other hand, if the switch 61A is in the OFF state and the switch 61B is in the ON state, the rotational position judging unit 261 judges the projector 1 to be stationary at the second projection position. Furthermore, if the switches 61A and 61B are both in the OFF state, the rotational position judging unit 261 judges the rotational position of the projector body 2 and the DVD player 3 to be an intermediate position.

If the projector 1 is judged to be stationary at the first projection position or the second projection position in the rotational position judging step S1, the audio data switching unit 262 instructs the audio processor 37 to switch the audio data to be outputted to the speakers 341 and 342 (step S2: audio data switching step).

More specifically, if the projector 1 is judged to be stationary at the first projection position in the rotational position judging step S1, the audio data switching unit 262 instructs the audio processor 37 to output the right audio data from the speaker 341 and to output the left audio data from the speaker 342. On the other hand, if the projector 1 is judged to be stationary at the second projection position in the rotational position judging step S1, the audio data switching unit 262 instructs the audio processor 37 to output the left audio data from the speaker 341 and to output the right audio data from the speaker 342. Incidentally, if the rotational position of the projector body 2 and the DVD player 3 are judged to be an intermediate position in the rotational position judging step S1, the audio data switching unit 262 instructs the speakers to continue outputting the audio data.

The control process for the projector 1 is carried out through execution of the above steps S1 and S2.

Figure 7A:
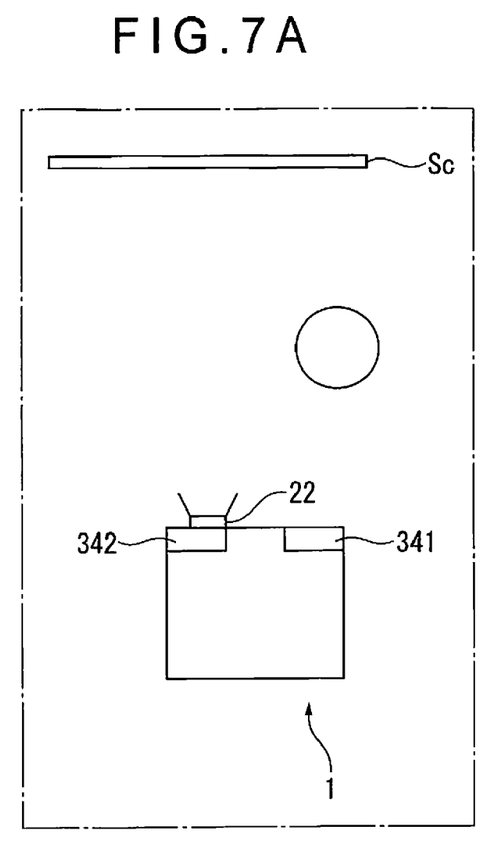
FIG. 7A is a schematic illustration showing how a screen, a projection lens, speakers, and a user of the projector are relatively positioned when the projector according to the exemplary embodiment is in a stationary state at the first projection position.
Figure 7B:
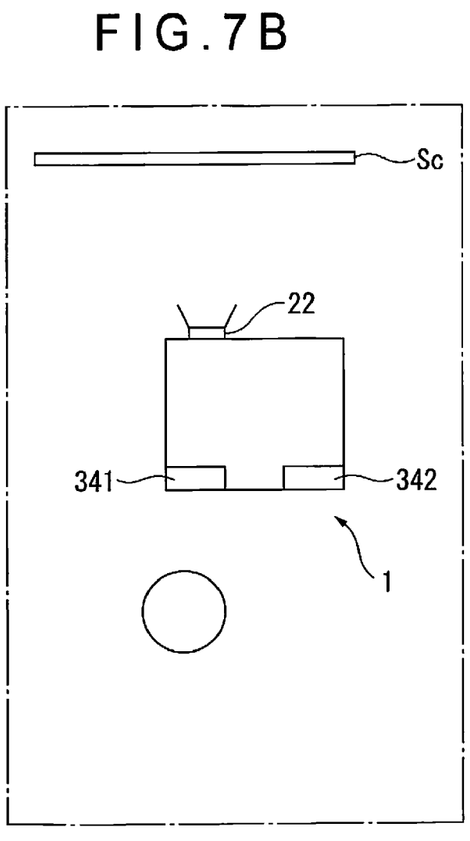
FIG. 7B is a schematic illustration showing how the screen, the projection lens, the speakers, and the user of the projector are relatively positioned when the projector according to the exemplary embodiment is in a stationary state at a second projection position.

Here, FIG. 7A is a schematic illustration showing how the screen Sc, the projection lens 22, the speakers 341 and 342, and a user of the projector 1 are relatively positioned when the projector 1 is in a stationary state at the first projection position. FIG. 7B is a schematic illustration showing how the screen Sc, the projection lens 22, the speakers 341 and 342, and the user of the projector 1 are relatively positioned when the projector 1 is in a stationary state at the second projection position. Note that the user of the projector 1 is represented by a circle in FIGS. 7A and 7B.

In the projector 1 shown in FIG. 7A, the projection lens 22 and the speakers 341 and 342 are on the same side. In the projector 1 shown in FIG. 7B, the projection lens 22 and the speakers 341 and 342 are on the opposite sides.

Since the speakers 341 and 342 are provided to both sides of the DVD slot 32 and the DVD operation display 33, it is assumed that the user takes a position between the projector 1 and the screen Sc when using the projector 1 in the stationary state at the first projection position (FIG. 7A). It is also assumed that the projector 1 is set between the user and the screen Sc when the projector 1 is stationary at the second projection position (FIG. 7B).

Accordingly, when the projector 1 is stationary at the first projection position, since user faces the screen Sc, the speaker 341 is located to the right of the user and the speaker 342 is located to the left of the user (FIG. 7A). When the projector 1 is stationary at the second projection position, since the user faces the screen Sc, the speaker 341 is positioned to the left of the user and the speaker 342 is positioned to the right of the user (FIG. 7B).

Thus, the first and second projection positions are such positions that relative positions of the speakers 341 and 342 relative to the projector body 2 are exchanged when the projector body 2 and the DVD player 3 are relatively rotated from one of the first and second projection positions to the other.

When the projector 1 is stationary at the first projection position, the audio data switching unit 262 instructs the audio processor 37 to output the right audio data from the speaker 341 and to output the left audio data from the speaker 342. Accordingly, sounds based on the left audio data are outputted from the speaker 342 that resides on the left of the user, and sounds based on the right audio data are outputted from the speaker 341 that resides on the right of the user.

When the projector 1 is stationary at the second projection position, the audio data switching unit 262 instructs the audio processor 37 to output the left-output audio data from the speaker 341 and to output the right-output audio data from the speaker 342. Therefore, sounds based on the left-output audio data are outputted from the speaker 341 that resides on the left of the user, and sounds based on the right-output audio data are outputted from the speaker 342 that resides on the right of the user.

In short, the audio data switching unit 262 switches the audio data outputted to the speakers 341 and 342 according to the setting position of the projector 1.

The following effects are obtained by the projector 1 according to the exemplary embodiment.

1 The projector 1 includes the audio data switching unit 262 which switches the audio data outputted to the speakers 341 and 342 according to the setting position of the projector 1. Accordingly, even when the setting position of the projector 1 is changed, the user can enjoy sounds with a sense of presence.

2 The switches 61A and 61B detect the first projection position and the second projection position, which helps the audio data switching unit 262 to switch the audio data so that sounds based on the left audio data are outputted from the speaker on the user's left side and sounds based on the right audio data are outputted from the speaker on the user's right side. Therefore, even when setting position of the projector 1 is changed, the user can enjoy sounds with a sense of presence.

3 Since the audio data switching unit 262 instructs the speakers to continue outputting the audio data, even when the rotational position of the projector body 2 and the DVD player 3 belongs to an intermediate position between the first projection position and the second projection position, sounds can be continuously outputted.

Second Exemplary Embodiment

A second exemplary embodiment of the invention will be described below with reference to the drawings.

Note that elements set forth above are denoted with like numerals and description thereof will be omitted.

In the first exemplary embodiment, the projector 1 is arranged as a stereo speaker system including the speakers 341 and 342.

The second exemplary embodiment differs from the first exemplary embodiment in that a projector 1A is arranged as a surround sound speaker system including four speakers 341 to 344.

Figure 8:
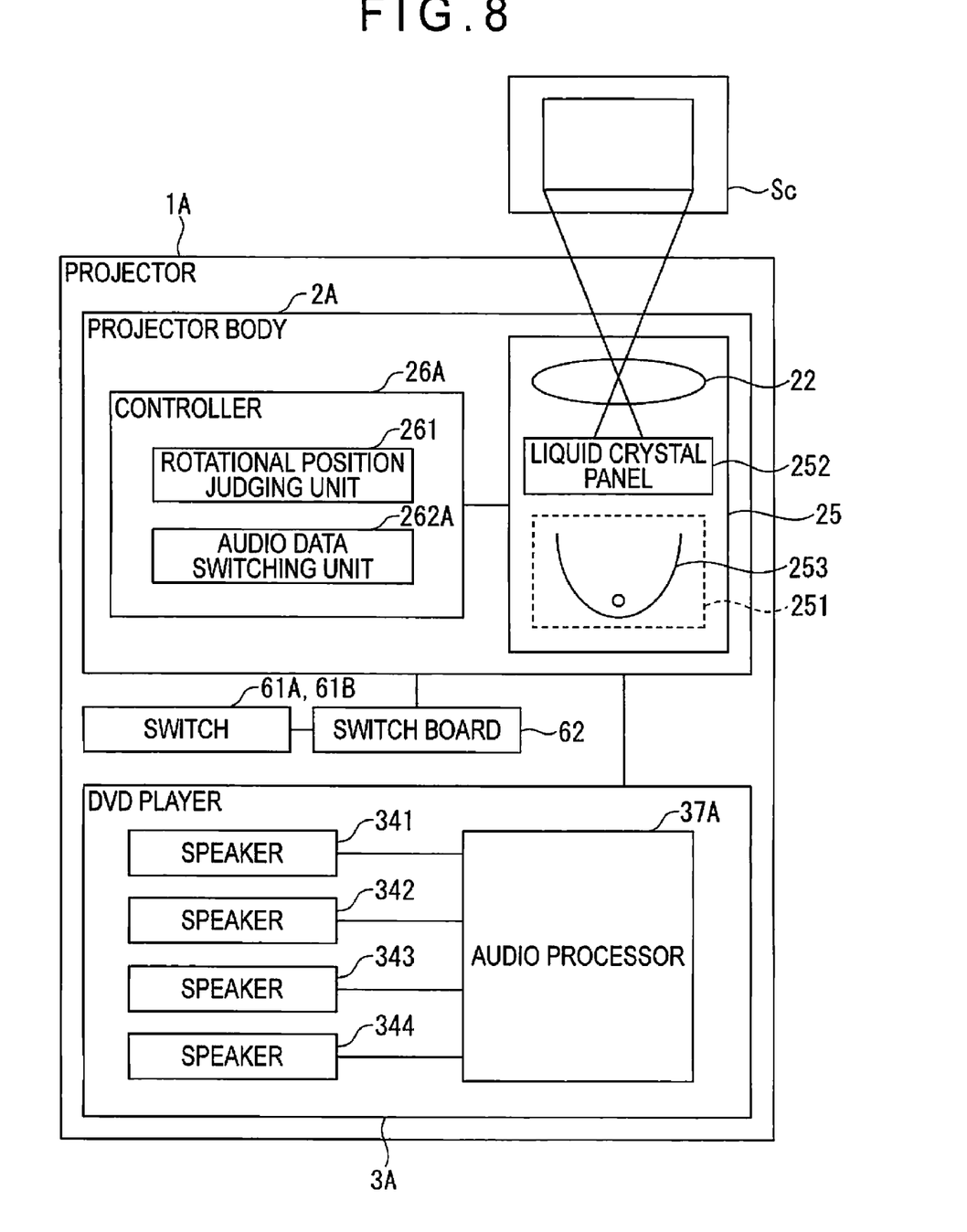
FIG. 8 is a block diagram showing an internal arrangement of a projector according to a second exemplary embodiment.

FIG. 8 is a block diagram showing an internal arrangement of the projector 1A.

As shown in FIG. 8, the DVD player 3A includes four speakers 341 to 344 and an audio processor 37A.

The audio processor 37A processes audio data recorded on a recording medium. Specifically, the audio processor 37A, based on the audio data recorded on the recording medium, separately processes: left front audio data for outputting sounds from a speaker on the left front side of a user; right front audio data for outputting sounds from a speaker on the right front side of the user; left rear audio data for outputting sounds from a speaker on the left rear side of the user; and right rear audio data for outputting sounds from a speaker on the right rear side of the user. Subsequently, the processed audio data are outputted via separate signal lines to the speakers 341 to 344 respectively communicated with the audio processor 37A.

The projector body 2A includes a controller 26A, which includes an audio data switching unit 262A.

Based on the judgment by the rotational position judging unit 261, the audio data switching unit 262A instructs the audio processor 37A to switch the audio data to be outputted to the speakers 341 to 344.

Figure 9A:
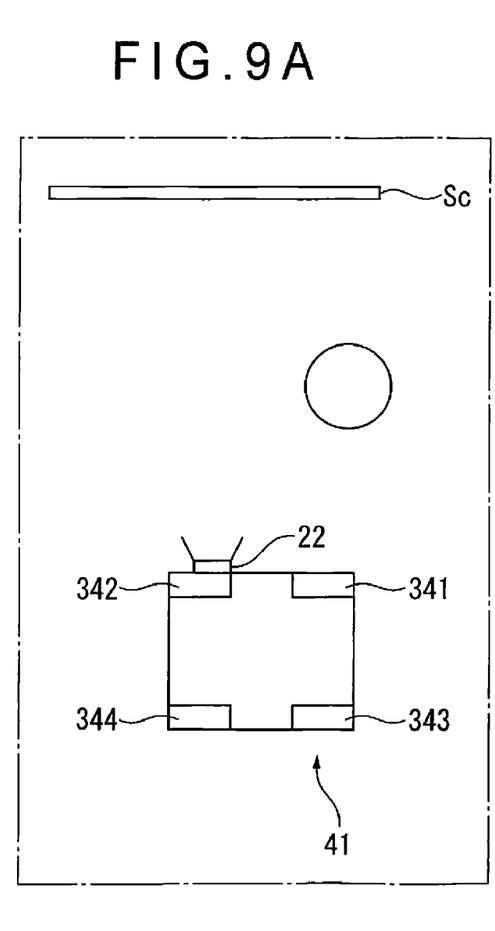
FIG. 9A is a schematic illustration showing how a screen, a projection lens, speakers, and a user of the projector are relatively positioned when the projector according to the exemplary embodiment is in a stationary state at a first projection position and a second projection position.
Figure 9B:
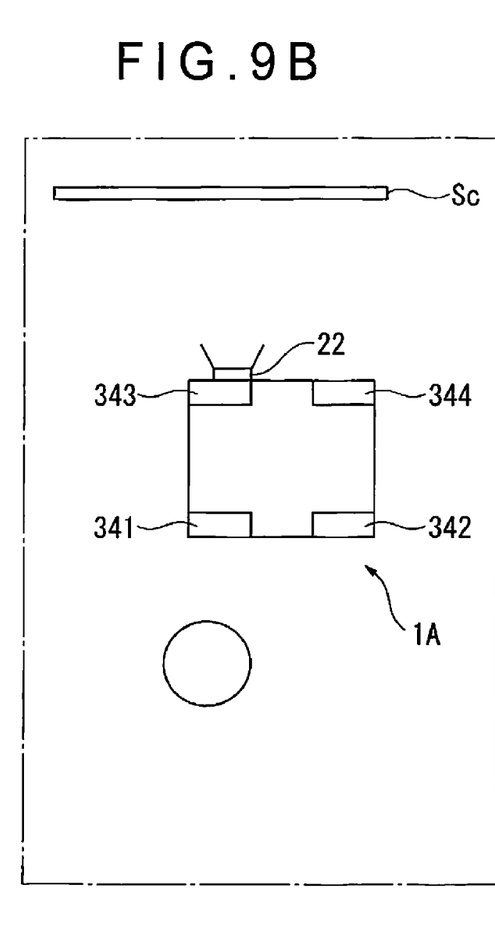
FIG. 9B is a schematic illustration showing how the screen, the projection lens, the speakers, and the user of the projector are relatively positioned when the projector according to the exemplary embodiment is in a stationary state at the first projection position and the second projection position.

FIG. 9A is a schematic illustration showing how the screen Sc, the projection lens 22, the speakers 341 to 344, and the user of the projector 1A are relatively positioned when the projector 1A is in a stationary state at the first projection position. FIG. 9B is a schematic illustration showing how the screen Sc, the projection lens 22, the speakers 341 to 344, and the user of the projector 1 are relatively positioned when the projector 1A is in a stationary state at the second projection position. Note that the user of the projector 1A is represented by a circle in FIGS. 9A and 9B.

In FIG. 9A, the projection lens 22 and the speakers 341 and 342 are on the same side, and the projection lens 22 and the speakers 343 and 344 are on opposite sides. In FIG. 9B, the projection lens 22 and the speakers 341 and 342 are on opposite sides, and the projection lens 22 and the speakers 343 and 344 are on the same side.

When the projector 1A is stationary at the first projection position, the audio data switching unit 262A instructs the audio processor 37A to output the right front audio data from the speaker 341, to output the left front audio data from the speaker 342, to output the right rear audio data from the speaker 343, and to output the left rear audio data from the speaker 344.

When the projector 1A is stationary at the second projection position, the audio data switching unit 262A instructs the audio processor 37A to output the left rear audio data from the speaker 341, to output the right rear audio data from the speaker 342, to output the left front audio data from the speaker 343, and to output the right front audio data from the speaker 344.

In the exemplary embodiment, the following function and effect are obtained in addition to the same functions and effects as the first exemplary embodiment.

4 Since the projector 1A is provided with the four speakers 341 to 344, the user can enjoy sounds even more greatly with a sense of presence.

Modifications of Embodiments

The scope of the invention is not limited to the above exemplary embodiments, but modifications, improvements and the like are included thereto as long as an object of the invention is achieved.

In the above exemplary embodiments, the rotational position detector 6 is formed by the switches 61A and 61B. However, the rotational position of the projector body and the audio system may be detected by any suitable means. For example, an optical sensor may be employed.

The audio data switching units 262, 262A of the exemplary embodiments switch the audio data to be outputted to the speakers 341 to 344 by controlling the audio processors 37, 37A that output audio data to the speakers 341 to 344. However, for example, an additional switch may be provided on a signal line connecting the audio processors 37, 37A and the speakers 341 to 344 and be controlled to switch the audio data outputted to the speakers 341 to 344. In short, the audio data switching unit may switch the audio data to be outputted to the speakers in any suitable manner.

The DVD players 3, 3A in the exemplary embodiment included the stereo speaker system formed by the two speakers 341 and 342 or the surround sound speaker system formed by four speakers 341 to 344. However, the audio system may be a monaural speaker system including one speaker or a surround sound speaker system including three, five, or more than five speakers. In short, any suitable audio system having a speaker or speakers may be employed for the projector.

In addition, when the number of surround channels is different from the number of speakers provided to the projector, the audio data processor may select a channel for outputting to the speaker. In short, the audio data switching unit may switch the audio data to be outputted to the speakers according to the setting position of the projector in any suitable manner. In this case, the projector may employ an arrangement in which the channels that are not used for output to the speakers may be used for output to the external speakers.

In the exemplary embodiment, the transmissive liquid crystal panel 252 is employed. However, a reflective crystal panel or a Digital Micromirror Device (DVD) may also be employed. Note that "DMD" is a trademark of Texas Instruments, Inc.

In the exemplary embodiment, the DVD player 3 is exemplified for an audio system. However, any audio system having at least a pair of speakers may be employed. For example, a CD player may be employed.

The invention may be applied for a projector, and in particular, for a projector having a projector body and an audio system.

What is claimed is:

1. A projector, comprising:
a projector body that includes an optical modulator that modulates light emitted from a light source according to an inputted image data to form an optical image and a projection optical device that projects the formed optical image in an enlarged manner;
an audio system that includes at least a pair of speakers that output sounds according to inputted audio data;
a connecting mechanism that connects the projector body and the audio system in a relatively rotatable manner;
a rotational position detector that detects a rotational position of the projector body and the audio system; and
an audio data switching unit that switches the audio data respectively outputted to each of the speakers based on detection by the rotational position detector.

2. The projector according to claim 1, wherein
the audio system comprises the pair of speakers arranged to output sounds substantially in the same direction, and
the rotational position detector detects as the rotational position of the projector body and the audio system a first projection position at which the projection optical device and the pair of the speakers are on the same side and a second projection position at which the projection optical device and the pair of the speakers are on opposite sides.

3. The projector according to claim 2, wherein
the audio data switching unit instructs the audio system to continuously output the audio data.

4. The projector according to claim 1, wherein
the audio system comprises at least thee speakers.

5. A control method for a projector, the projector comprising a projector body that includes an optical modulator that modulates light emitted from a light source according to an inputted image data to form an optical image and a projection optical device that projects the formed optical image in an enlarged manner, an audio system that includes a speaker including at least a pair of speakers that output sounds according to inputted audio data, and a connecting mechanism that connects the projector body and the audio system in a relatively rotatable manner, the control method comprising:
switching the audio data to be outputted to the speaker based on detection by a rotational position detector that detects a rotational position of the projector body and the audio system.

* * * * *